US007773187B2

(12) United States Patent
Takenaka et al.

(10) Patent No.: US 7,773,187 B2
(45) Date of Patent: Aug. 10, 2010

(54) LIQUID CRYSTAL DISPLAY DEVICE

(75) Inventors: Yuuichi Takenaka, Chiba (JP); Ryutaro Oke, Chiba (JP); Masafumi Hirata, Ooamishirasato (JP)

(73) Assignees: Hitachi Displays, Ltd., Chiba-ken (JP); IPS Alpha Technology, Ltd., Chiba-ken (JP)

( * ) Notice: Subject to any disclaimer, the term of this patent is extended or adjusted under 35 U.S.C. 154(b) by 282 days.

(21) Appl. No.: 12/108,535

(22) Filed: Apr. 24, 2008

(65) Prior Publication Data

US 2008/0266506 A1 Oct. 30, 2008

(30) Foreign Application Priority Data

Apr. 27, 2007 (JP) ............................ 2007-118270

(51) Int. Cl.
*G02F 1/133* (2006.01)

(52) U.S. Cl. ....................................... 349/150; 349/149

(58) Field of Classification Search ....................... None
See application file for complete search history.

(56) References Cited

U.S. PATENT DOCUMENTS

| | | | | |
|---|---|---|---|---|
| 5,831,605 | A | 11/1998 | Yasui et al. | |
| 6,756,958 | B2 * | 6/2004 | Furuhashi et al. | 345/95 |
| 2002/0063703 | A1 * | 5/2002 | Furuhashi et al. | 345/212 |
| 2005/0253836 | A1 * | 11/2005 | Kim et al. | 345/212 |
| 2007/0182909 | A1 * | 8/2007 | Kim et al. | 349/149 |
| 2007/0279355 | A1 * | 12/2007 | Hirata et al. | 345/87 |

FOREIGN PATENT DOCUMENTS

| | | |
|---|---|---|
| JP | 9-218388 | 8/1997 |
| JP | 2002-169138 | 6/2002 |

* cited by examiner

*Primary Examiner*—Michelle R Connelly Cushwa
(74) *Attorney, Agent, or Firm*—Antonelli, Terry, Stout & Kraus, LLP.

(57) ABSTRACT

The present invention provides a liquid crystal display device which can enhance the accuracy in feeding back a common potential applied to common voltage supply lines. A display panel includes a common bus line electrically connected to common electrodes and formed annularly on a periphery of the display region, a common sensing line for feeding back a voltage of the common bus line to a control printed circuit board, a scanning-signal-drive-circuit-use power source line for supplying electricity for driving a scanning signal drive circuit, and a common-voltage-supply-use line for supplying a common voltage to the common bus line. The common-voltage-supply-use line, the common sensing line and the scanning-signal-drive-circuit-use power source line are formed along one side of the display panel to which at least the scanning signal drive circuit is connected. The common sensing line is formed between the common-voltage-supply-use line and the scanning-signal-drive-circuit-use power source line on one side of the display panel.

10 Claims, 7 Drawing Sheets

LIQUID CRYSTAL DISPLAY DEVICE

BACKGROUND OF THE INVENTION

1. Field of the Invention

The present invention relates to a liquid crystal display device, and more particularly to the enhancement of display property of a display panel of the display device.

2. Description of Related Art

Conventionally, with respect to a liquid crystal display device which includes a liquid crystal display panel formed by sealing a liquid crystal material between a pair of substrates, for example, there has been known a lateral-electric-field driving liquid crystal display device such as an IPS (In-Plane-System) liquid crystal display device. A liquid crystal display panel which is used in the lateral-electric-field driving liquid crystal display device forms pixel electrodes and common electrodes (also referred to as counter electrodes) on one substrate out of the pair of substrates.

Here, the common electrodes are, for example, connected with a common voltage supply line which stereoscopically intersects a plurality of scanning signal lines or a plurality of video signal lines formed on the substrate. Here, outside a display region of the substrate, for example, an annular common bus line which surrounds the display region is arranged, and the common voltage supply lines are connected with the common bus line.

The voltage of the common potential applied to the common voltage supply lines and the counter electrodes is, for example, generated by a common voltage generation circuit which is formed on a printed circuit board having a timing controller (T-CON). Then, the voltage of the common potential is supplied to the common bus lines from a plurality of printed circuit boards which is connected with the display panel (substrate).

Further, the common voltage supply line intersects the plurality of scanning signal lines or the plurality of video signal lines stereoscopically and hence, intersection capacitances which are generated on intersection regions generate noises, and there exists a possibility that irregularities are generated with respect to potential of the common voltage supply lines (common electrodes). Accordingly, in the liquid crystal display panel of recent years, the potential of the common voltage supply lines is measured, and the potential is fed back to the voltage of the generated common potential thus lowering the irregularities of potential of the common voltage supply lines (common electrodes) (see JP-A-2002-169138 (corresponding U.S. Pat. No. 6,756,958) (patent document 1), JP-A-9-218388 (corresponding U.S. Pat. No. 5,831,605) (patent document 2), for example).

SUMMARY OF THE INVENTION

However, in the conventional feedback method, for example, it is often the case that the potential of the common voltage supply lines is measured at a portion thereof close to a position where the voltage of the common potential is inputted. Accordingly, for example, the measured common potential is influenced but a little by the intersection capacitances which are generated at regions where the common voltage supply lines stereoscopically intersect the plurality of scanning signal lines or the plurality of video signal lines thus giving rise to a drawback that the accuracy in stabilizing the potential by feedback is low. As a result, for example, there exists a drawback that the irregularities of image quality are generated between a portion of the display region close to a position at which the voltage of common potential is inputted and a portion of the display screen remote from the position at which the voltage of common potential is inputted.

Further, a line for detecting a common potential and feeding back the common potential to a voltage is arranged outside the display region on the substrate. The longer the length of the line for feeding back the common potential, there exists a possibility that a current which flows in the line is influenced by peripheral equipments thus giving rise to a drawback that an accurate detected potential cannot be fed back to the voltage.

It is an object of the present invention to provide a technique which can enhance accuracy at the time of feeding back a common potential applied to common voltage supply lines.

The above-mentioned and other objects and novel features of the present invention will become apparent from the description of this specification and attached drawings.

To achieve the above-mentioned objects, the present invention is directed to a liquid crystal display device which includes a display panel including a plurality of scanning signal lines, a plurality of video signal lines, pixel electrodes each of which is arranged in a pixel region defined by the scanning signal lines and the video signal lines, and a common electrode, and a control printed circuit board including a scanning signal drive circuit for supplying a scanning signal to the scanning signal lines, a video signal drive circuit for supplying a video signal to the video signal lines, and a control circuit for controlling the signals supplied to the scanning signal drive circuit and the video signal drive circuit, wherein the display panel includes a common bus line electrically connected to the common electrodes and formed annularly on a periphery of the display region, a common sensing line for feeding back a voltage of the common bus line to the control printed circuit board, a scanning-signal-drive-circuit-use power source line for supplying electricity for driving the scanning signal drive circuit, and a common-voltage-supply-use line for supplying a common voltage to the common bus line, and the common-voltage-supply-use line, the common sensing line and the scanning-signal-drive-circuit-use power source line are formed along one side of the display panel to which at least the scanning signal drive circuit is connected, and the common sensing line is formed between the common-voltage-supply-use line and the scanning-signal-drive-circuit-use power source line on one side of the display panel.

According to the present invention, it is possible to enhance the detection accuracy of a common potential and to stabilize the supply of the common potential.

DESCRIPTION OF THE PREFERRED EMBODIMENT

Hereinafter, the present invention is explained in detail in conjunction with an embodiment by reference to the drawings.

Here, in all drawings for explaining the embodiment, parts having identical functions are given same symbols and their repeated explanation is omitted.

FIG. 1 to FIG. 5 are schematic views showing one constitutional example of a display panel to which the present invention is applied.

Figure 1:
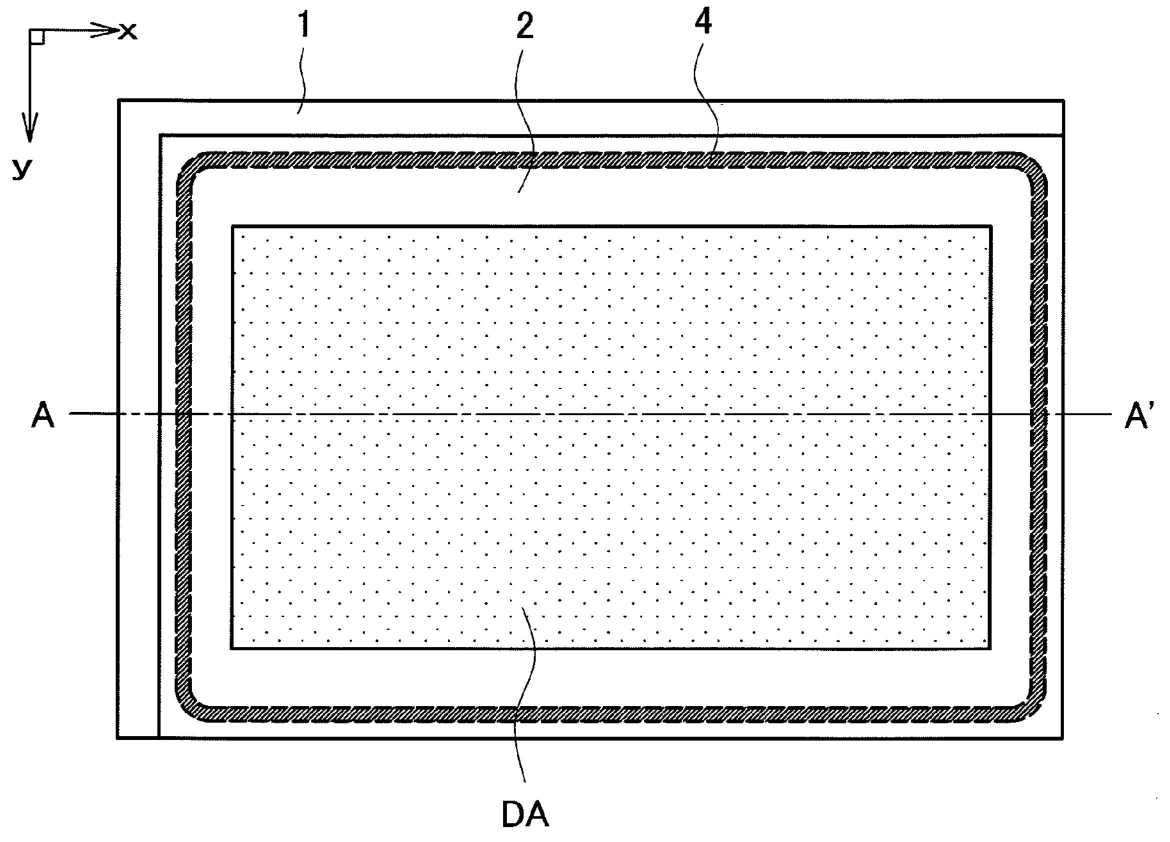
FIG. 1 is a schematic plan view of a liquid crystal display panel as viewed from a viewer's side.
Figure 2:
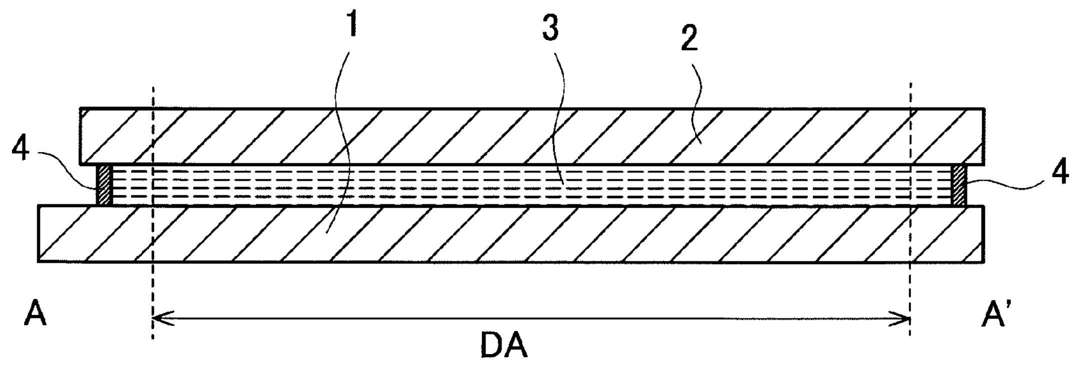
FIG. 2 is a schematic cross-sectional view taken along a line A-A' in FIG. 1.
Figure 3:
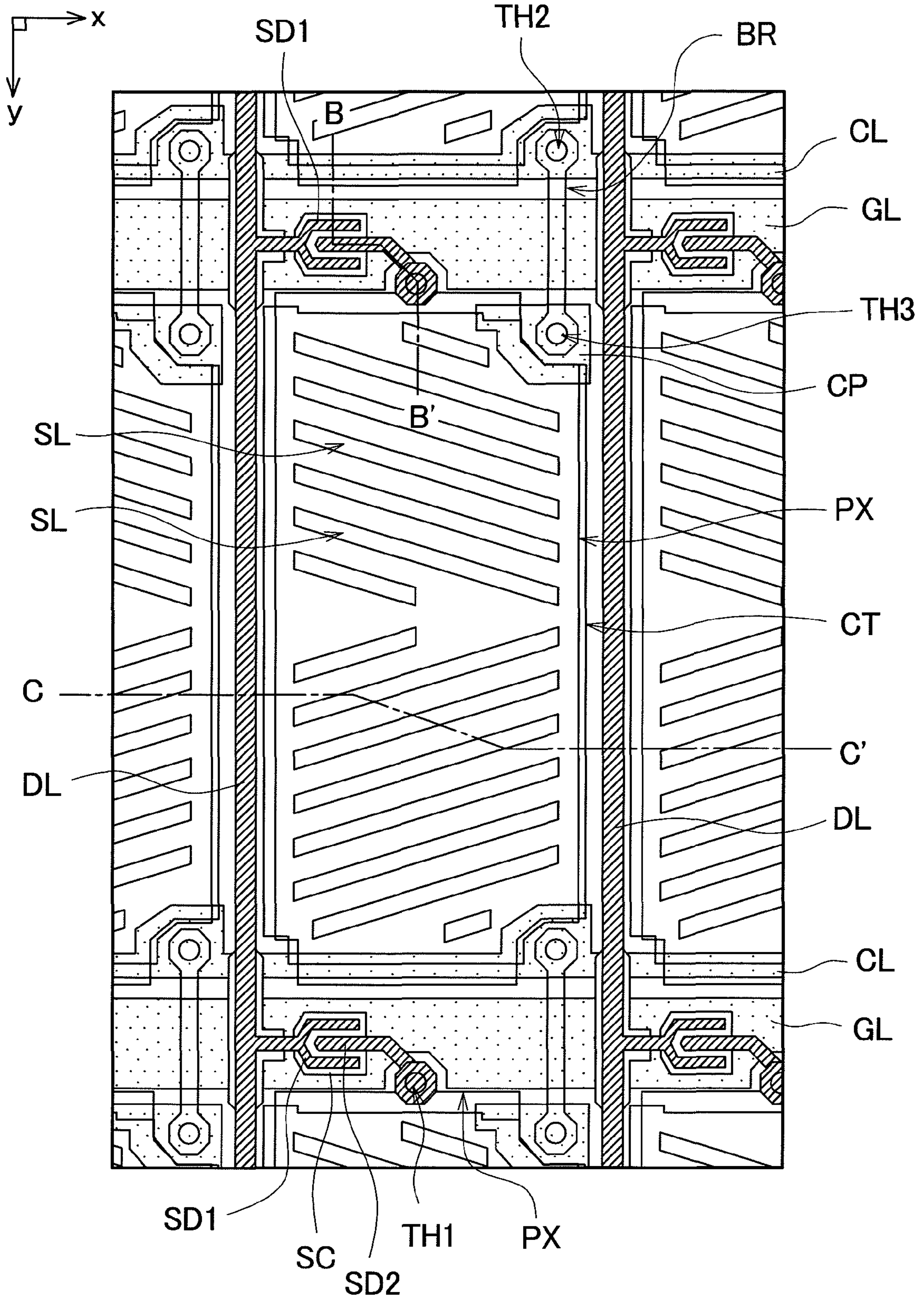
FIG. 3 is a schematic plan view showing a constitutional example of one pixel in a display region on a TFT substrate of the liquid crystal display panel.
Figure 4:
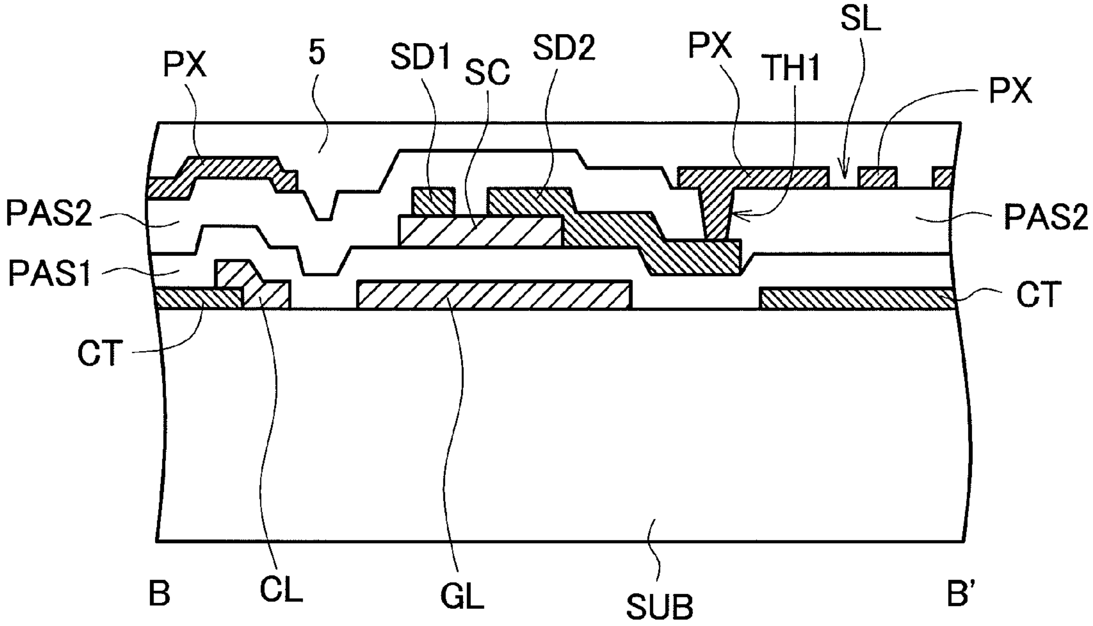
FIG. 4 is a schematic cross-sectional view taken along a line B-B' in FIG. 3.
Figure 5:
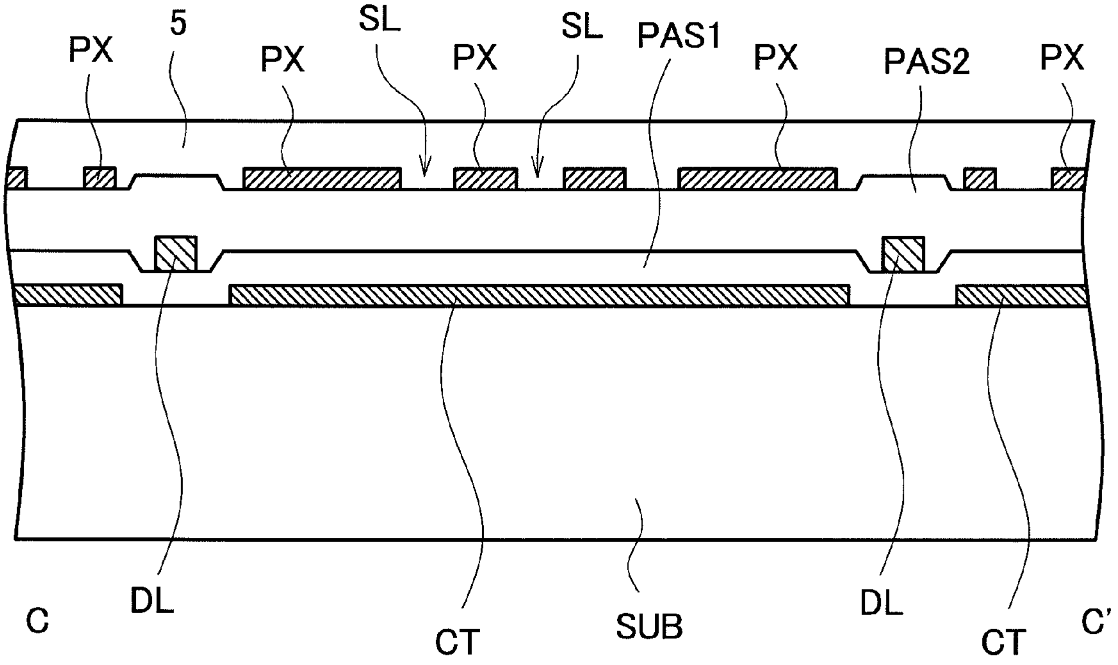
FIG. 5 is a schematic cross-sectional view taken along a line C-C' in FIG. 3.

FIG. 1 is a schematic plan view of a liquid crystal display panel as viewed from a viewer side. FIG. 2 is a schematic cross-sectional view taken along a line A-A' in FIG. 1. FIG. 3 is a schematic plan view showing a constitutional example of one pixel in a display region on a TFT substrate of the liquid crystal display panel. FIG. 4 is a schematic cross-sectional view taken along a line B-B' in FIG. 3. FIG. 5 is a schematic cross-sectional view taken along a line C-C' in FIG. 3.

The present invention relates to a display panel which forms a plurality of scanning signal lines and a plurality of video signal lines on a substrate thereof, and also forms common voltage supply lines which stereoscopically intersect the scanning signal lines or the video signal lines on the substrate. As such a display panel, there exists a lateral-electric-field driving liquid crystal display panel such as an IPS liquid crystal display panel.

The liquid crystal display panel is, for example, as shown in FIG. 1 and FIG. 2, a display panel which seals a liquid crystal material 3 between a pair of substrates 1, 2. Here, the pair of substrates 1, 2 is adhered to each other with a sealing material 4 which is annularly arranged outside a display region DA. The liquid crystal material 3 is sealed in a space surrounded by the pair of substrates 1, 2 and the sealing material 4.

Out of the pair of substrates 1, 2, the substrate 1 having a larger profile size as viewed form a viewer's side is generally referred to as a TFT substrate. Although not shown in FIG. 1 and FIG. 2, the TFT substrate 1 is configured such that, on a surface of a transparent substrate such as a glass substrate, the plurality of scanning signal lines, and the plurality of video signal lines which stereoscopically intersect the plurality of scanning signal lines by way of an insulation layer are formed. A region which is surrounded by two neighboring scanning signal lines and two neighboring video signal lines corresponds to one pixel region, and a TFT element, a pixel electrode and the like are arranged in each pixel region. Further, another substrate 2 which makes the pair with the TFT substrate 1 is generally referred to as a counter substrate. Further, the display region DA is formed of a mass of a large number of pixel regions arranged in the x direction as well as in the y direction in a matrix array.

Further, when the liquid crystal display panel adopts a lateral-electric-field driving method such as an IPS method, for example, common electrodes (also referred to as counter electrodes) which face the pixel electrodes on the TFT substrate 1 are formed on the TFT substrate 1 side.

Next, a constitutional example of one pixel of the display region DA of the liquid crystal display panel adopting the lateral-electric-field driving method is briefly explained in conjunction with FIG. 3 to FIG. 5.

In the liquid crystal display panel adopting the lateral-electric-field driving method, the pixel electrodes and the common electrodes are formed on the TFT substrate 1 side. Here, the TFT substrate 1 is, for example, as shown in FIG. 3 to FIG. 5, configured such that, on a surface of the glass substrate SUB, the plurality of scanning signal lines GL which extends in the x direction is formed, and over the scanning signal lines GL, the plurality of video signal lines DL which extends in the y direction and stereoscopically intersects the plurality of scanning signal lines GL by way of a first insulation layer PAS1 are formed. Further, the region which is surrounded by two neighboring scanning signal lines GL and two neighboring video signal lines DL corresponds to one pixel region.

Further, on the surface of the glass substrate SUB, for example, a planar common electrode CT is formed for every pixel region. Here, the common electrodes CT of the respective pixel regions arranged in the x direction are electrically connected with each other by common signal lines CL arranged parallel to the scanning signal line GL. Further, as viewed from the scanning signal line GL, on a side opposite to the direction along which the common signal line CL is arranged, a common connection pad CP which is electrically connected with the common electrode CT is provided.

Further, over the first insulation layer PAS1, besides the video signal lines DL, semiconductor layers, drain electrodes SD1 and source electrode SD2 are formed. Here, the semiconductor layers are formed using amorphous silicon (a-Si), for example. The semiconductor layers are constituted of not only semiconductor layers having a function of channel layers SC of TFT elements which are arranged for respective pixel regions but also semiconductor layers which prevent short-circuiting between the scanning signal lines GL and the video signal lines DL at regions where the scanning signal lines GL and the video signal lines DL stereoscopically intersect with each other (not shown in the drawing). Here, to the semiconductor layer which has the function of the channel layer SC of the TFT elements, both of the drain electrode SD1 and the source electrode SD2 which are connected to the video signal line DL are connected. Further, although not shown in the drawing, in a connection interface between the channel layer SC and the drain electrode SD1 and in a connection interface between the channel layer SC and the source electrode SD2, for example, a contact layer formed of a semiconductor layer which differs from the channel layer SC in kind and concentration of impurity is interposed.

Further, over a surface (layer) on which the video signal lines DL and the like are formed, the pixel electrodes PX are formed by way of a second insulation layer PAS2. The pixel electrodes PX are electrodes which are arranged independently for respective pixel regions, wherein the pixel electrode PX is electrically connected with the source electrode SD2 at an opening portion (through hole) TH1 which is formed in the second insulation layer PAS2. Further, when the common electrode CT and the pixel electrode PX are, as shown in FIG. 3 to FIG. 5, arranged in a stacked manner by way of the first insulation layer PAS1 and the second insulation layer PAS2, the pixel electrode PX is formed of a comb-teeth electrode in which slits SL are formed.

Further, over the second insulation layer PAS2, besides the pixel electrodes PX, for example, bridge lines BR each of which electrically connecting two common electrodes CT arranged vertically with the scanning signal line GL sandwiched therebetween are formed. Here, the bridge line BR is connected with the common signal line CL and a common connection pad CP which is arranged with the scanning signal line GL sandwiched therebetween via through holes TH2, TH3.

Further, over the second insulation layer PAS2, an orientation film 5 is formed to cover the pixel electrodes PX and the bridge lines BR. Here, although not shown in the drawing, the counter substrate 2 is arranged to face the surface of the TFT substrate 1 on which the orientation film 5 is formed.

The liquid crystal display device is constituted by combining a backlight unit having light sources formed of fluorescent lamps such as CCFLs or EEFLs or LEDs with the liquid crystal display panel in which one pixel has the constitution shown in FIG. 3 to FIG. 5.

Hereinafter, a constitutional example in which the present invention is applied to the liquid crystal display device, and the manner of operation and advantageous effects of the constitutional example are explained.

Embodiment

Figure 6:
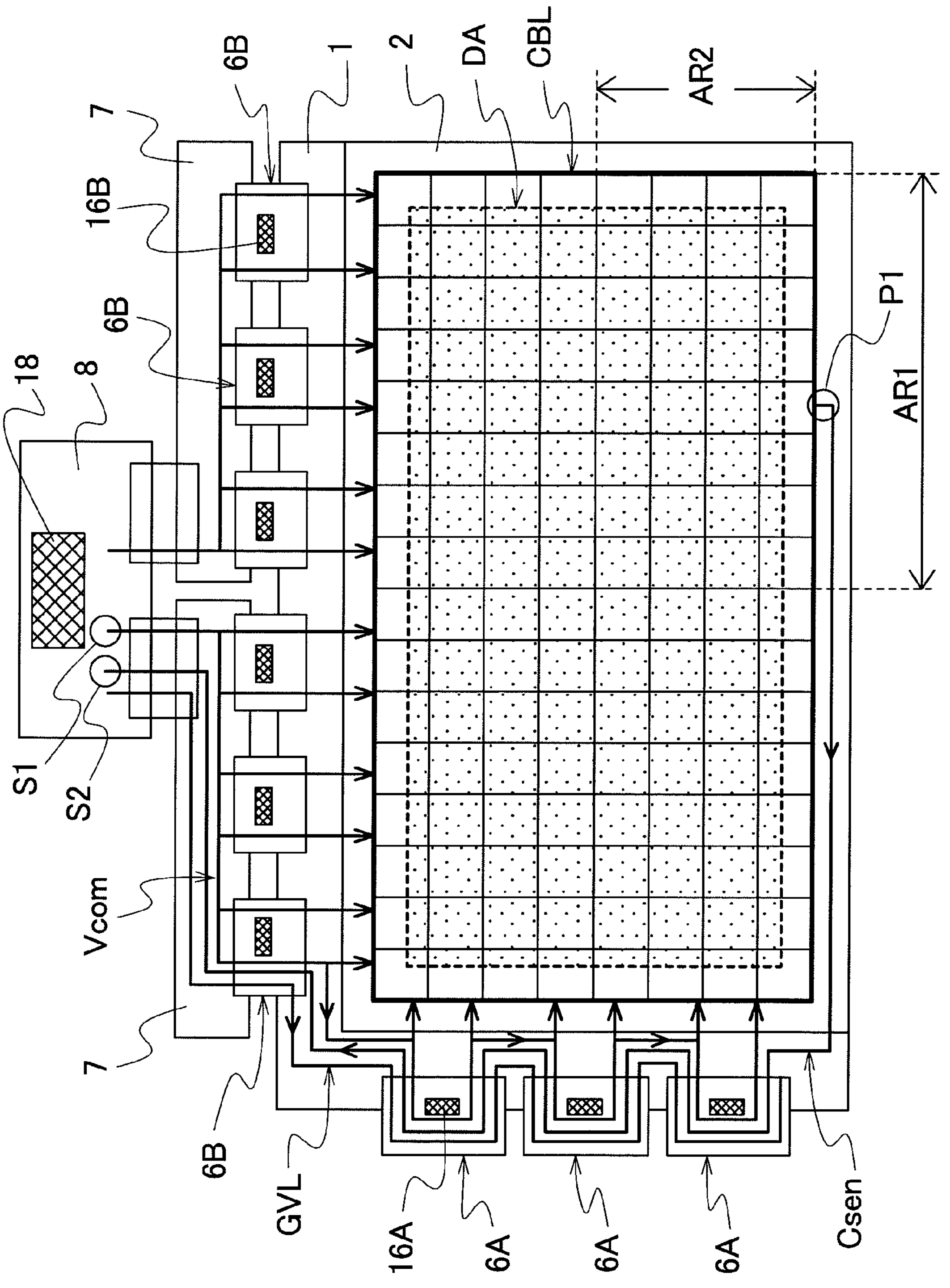
FIG. 6 is a schematic view showing the schematic constitution of a liquid crystal display device of one embodiment according to the present invention.

FIG. 6 is a schematic view showing the schematic constitution of the liquid crystal display device of one embodiment according to the present invention.

In the liquid crystal display device of this embodiment, on the TFT substrate 1 of the liquid crystal display panel, for example, as shown in FIG. 6, common voltage supply lines which longitudinally traverse the display region DA and common voltage supply lines which laterally traverse the display region DA are arranged in a net shape or in a matrix array. Here, the common voltage supply lines which longitudinally traverse the display region DA are, for example, constituted of the bridge lines BR and the common electrodes CT. On the other hand, the common voltage supply lines which laterally traverse the display region DA are constituted of the common signal lines CL which are arranged in parallel with the scanning signal lines GL. Further, the common voltage supply lines which are arranged in the display region DA in a net shape or in a matrix array are connected to a common bus line CBL which is annularly arranged outside the display region DA.

A plurality of flexible printed circuit boards 6A such as COFs (Chip On Films) on which scanning driver ICs 16A for supplying scanning signals to the scanning signal lines GL are mounted are connected to one side (for example, left end side) of the TFT substrate 1, for example. Further, a plurality of flexible printed circuit boards 6B such as COFs on which data driver ICs 16B for supplying video signals to the video signal lines DL are mounted are connected to another side (for example, upper end side) of the TFT substrate 1 which abuts on the above-mentioned one side. Further, the flexible printed circuit boards 6B are connected with another printed circuit board 7. Still further, the printed circuit board 7 is connected to a control printed circuit board 8 including the timing controller (T-CON) 18, a common voltage generation circuit, a feedback circuit (not shown in the drawing) and the like.

In the liquid crystal display device of this embodiment, a voltage of a common potential generated by the common voltage generation circuit in the inside of the control printed circuit board 8 is supplied to the common bus line CBL of the TFT substrate 1 via the printed circuit board 7 and the flexible printed circuit boards 6A, 6B through a common-voltage-supply-use line Vcom.

Further, a common sensing line Csen is connected to the common bus line CBL. The common sensing line Csen is provided for measuring a potential of the common bus line CBL and a potential of the common-voltage-supply-use line Vcom and for adjusting the voltage of the common potential generated by the common voltage generation circuit in the inside of the control printed circuit board 8. The common sensing line Csen is arranged to be connected to the control printed circuit board 8 via the flexible printed circuit boards 6A, 6B and the printed circuit board 7.

Further, a driver-power-source supply line GVL for supplying power source to the scanning driver ICs 16A on the flexible printed circuit boards 6A via the printed circuit boards 7 and the flexible printed circuit boards 6B extends from the control printed circuit board 8.

As shown in FIG. 6, a detection end P1 of the common sensing line Csen is connected to a side to which the flexible printed circuit boards 6A or the flexible printed circuit boards 6B is not connected out of four sides of the common bus line CBL, for example. Here, it is preferable to arrange the detection end P1 in a region AR1 or a region AR2 which corresponds to a side opposite to a side of the common bus line CBL to which the flexible printed circuit boards 6A or the flexible printed circuit boards 6B are connected. Due to such a constitution, it is possible to detect a potential which changes more sharply.

The common sensing line Csen is arranged outside the common bus line CBL, is branched from the common bus line CBL, and is pulled around a region of the TFT substrate 1 to which the flexible printed circuit boards 6A are connected along an outer periphery of the common bus line CBL. Here, the common sensing line Csen is pulled around such that the common sensing line Csen does not stereoscopically intersect other conductive layers mounted on the TFT substrate 1. Accordingly, for example, as shown in FIG. 6, the common sensing line Csen is led to the flexible printed circuit boards 6B via the flexible printed circuit boards 6A and, thereafter, is connected to the control printed circuit board 8 via the printed circuit boards 7.

The feedback circuit in the inside of the control printed circuit board 8 compares a potential of the common bus line CBL acquired by the common sensing line Csen and a reference potential generated by the common voltage generation circuit in the inside of the control printed circuit board 8 and calculates the degree of irregularities of potential. Further, when the irregularity of potential is equal to or more than a threshold value, for example, based on the difference between the measured potential and the reference potential, a voltage of the common potential which allows the measured potential of the common bus line CBL and the potential of the common voltage supply lines to assume the reference potential is generated by the common voltage generation circuit. Further, the generated voltage of the common potential is outputted to the common-voltage-supply-use line Vcom.

As described above, in this embodiment, between the control printed circuit board 8 and the TFT substrate 1, the common-voltage-supply-use line Vcom, the common sensing line Csen and the driver-power-source supply line GVL are arranged. Here, the common sensing line Csen runs or is arranged parallel to the common-voltage-supply-use line Vcom and the driver-power-source supply line GVL at a portion thereof which passes the flexible printed circuit boards 6A and reaches the printed circuit board 7.

In the constitution explained in conjunction with FIG. 6, although the driver-power-source supply line GVL on the flexible printed circuit board 6A is not connected to the scanning driver IC 16A, in an actual liquid crystal display device, for example, on the flexible printed circuit board 6A, the driver-power-source supply line GVL includes a branch line which intersects the common sensing line Csen and the common-voltage-supply-use line Vcom, and the driver-power-source supply line GVL and a power source terminal of the scanning driver IC 16A are connected with each other by the branch line.

Further, in this embodiment, the respective lines, that is, the driver-power-source supply line GVL, the common sensing line Csen and the common-voltage-supply-use line Vcom are arranged in this order from the outside of the TFT substrate 1. Such constitution is adopted for suppressing a phenomenon that undesired noises enter the common sensing line Csen. Hereinafter, the manner of operation and advantageous effects when such arrangement constitution is adopted are briefly explained.

Figure 7:
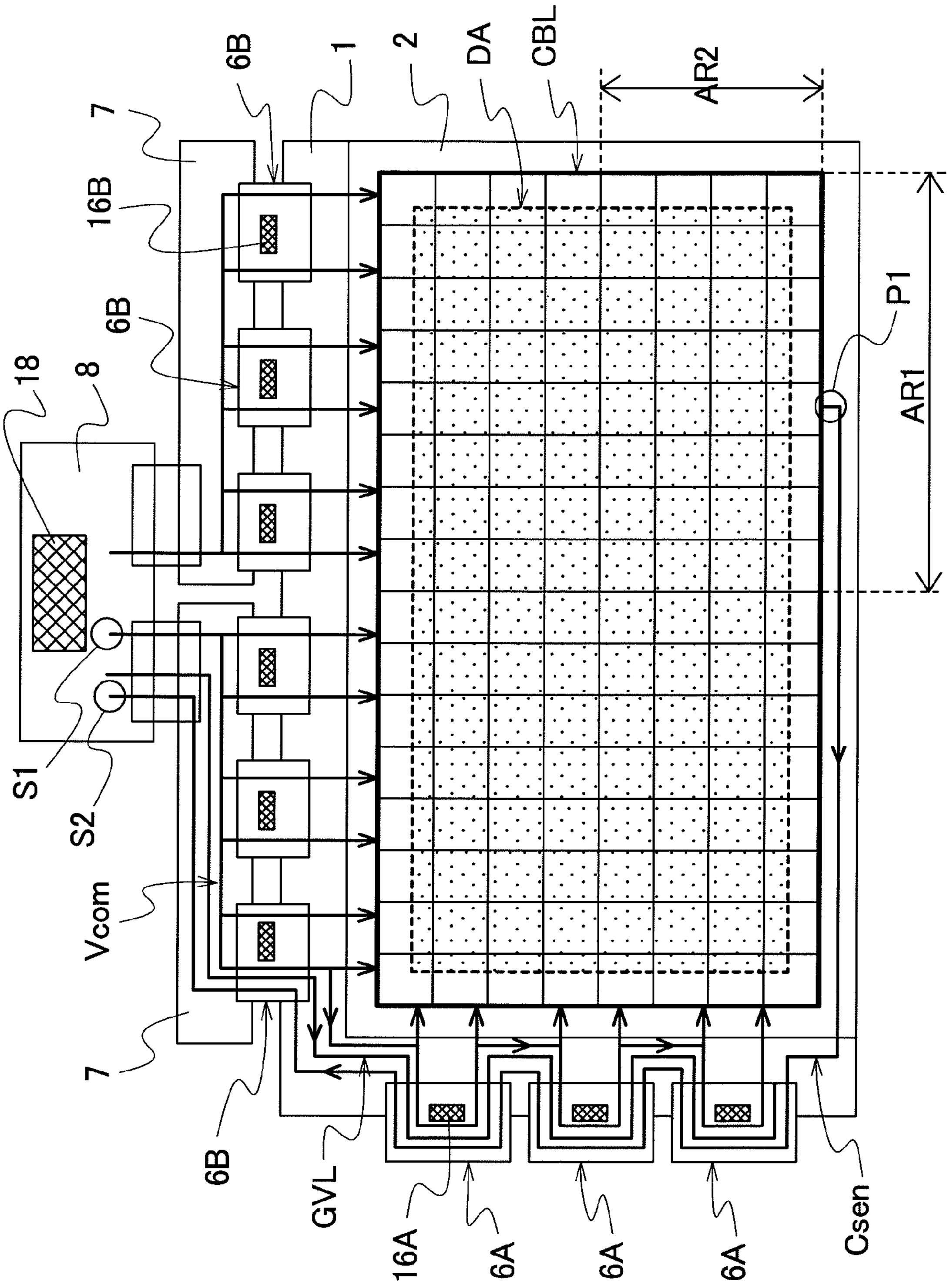
FIG. 7 is a schematic view showing one constitutional example of a liquid crystal display device having the constitution substantially equal to the constitution of the liquid crystal display device shown in FIG. 6.
Figure 8A:
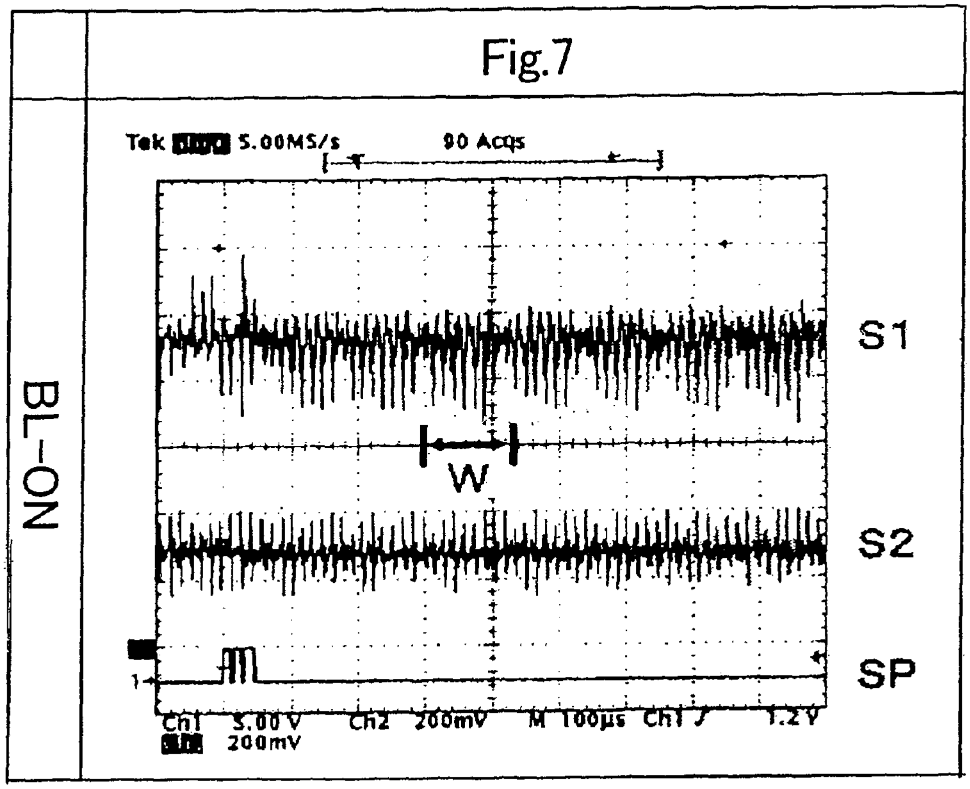
FIG. 8A is a waveform diagram for explaining a difference between the liquid crystal display device having the constitution shown in FIG. 6
Figure 8A:
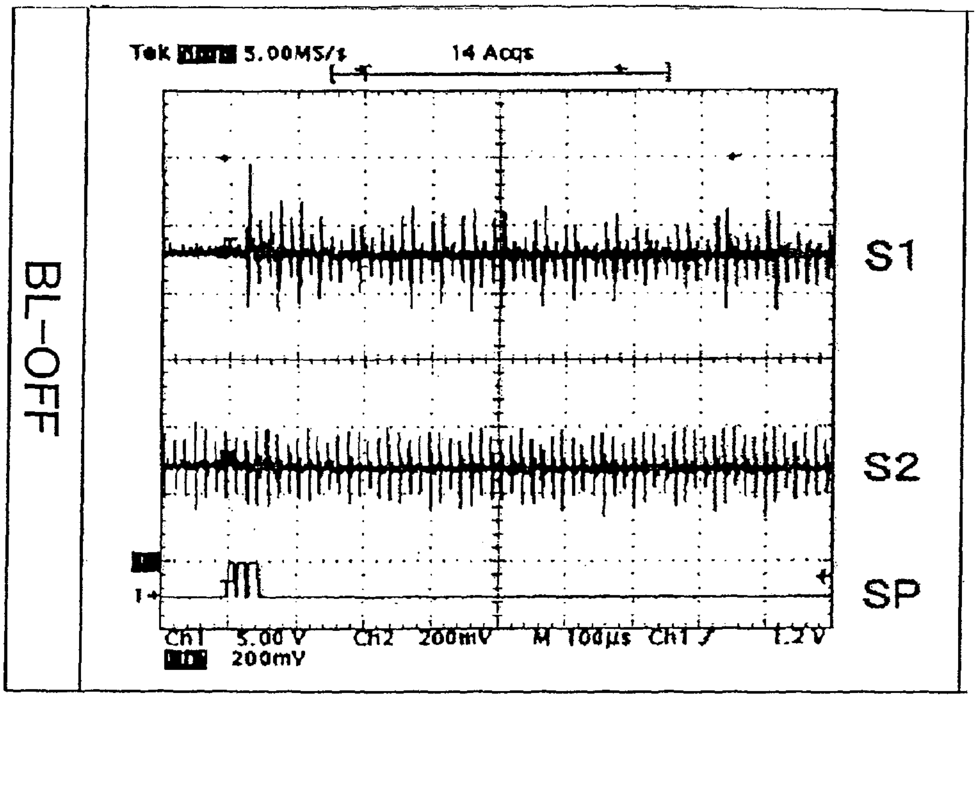
Figure 8B:
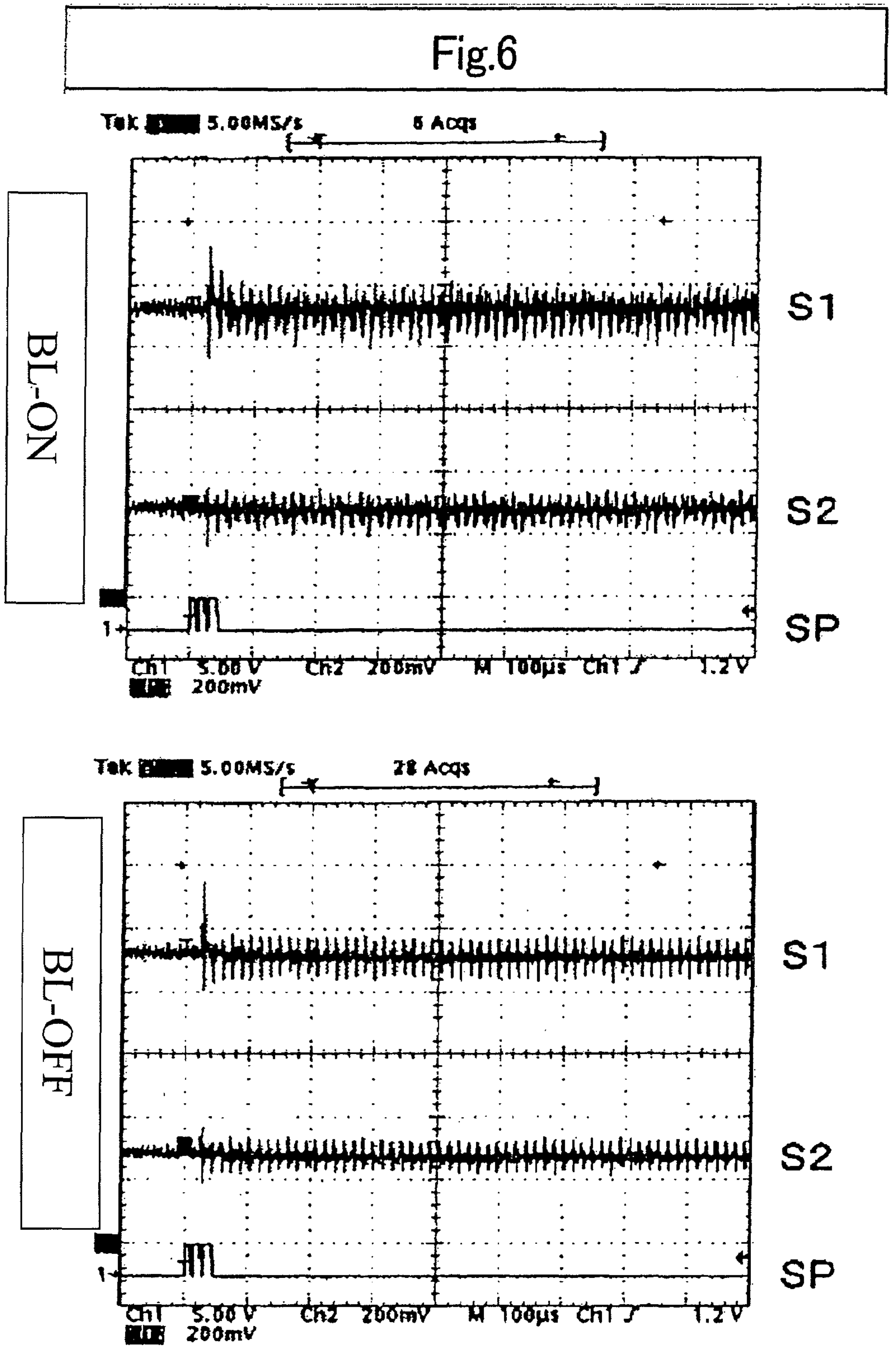
FIG. 8B is a waveform diagram for explaining a difference between the liquid crystal display device having the constitution shown in FIG. 7.

FIG. 7 and FIGS. 8A and 8B are schematic views for explaining the manner of operation and advantageous effects of the liquid crystal display device of this embodiment.

FIG. 7 is a schematic view showing one constitutional example of a liquid crystal display device having the constitution substantially equal to the constitution of the liquid crystal display device shown in FIG. 6, and FIG. 8B is a waveform diagram for explaining a difference between the liquid crystal display device having the constitution shown in FIG. 6 and FIG. 8B is a waveform diagram for explaining the differences between the liquid crystal display device having the constitution shown in FIG. 7. Here, a point which makes the liquid crystal display device shown in FIG. 7 different from the liquid crystal display device shown in FIG. 6 lies in the arrangement order of the driver-power-source supply line GVL and the common sensing line Csen. In the liquid crystal display device exemplified in FIG. 7, the common sensing line Csen is arranged on an outermost side.

In four waveform diagrams shown in FIGS. 8A and 8B, three waveforms are depicted in each waveform diagram. In the upper waveform diagram and the lower waveform diagram of FIG. 8A, waveforms acquired at the detection ends Si and S2 in the control printed circuit board 8 shown in FIG. 7 and a start pulse SP indicative of start timing of one frame are shown. Here, an input voltage of the common-voltage-supply-use line Vcom is measured at the detection end S1, and a detection voltage of the common sensing line Csen is measured at the detection end S2.

Further, in FIG. 8B, in the upper waveform diagram and the lower waveform diagram, waveforms acquired at the detection ends S1 and S2 in the control printed circuit board 8 and a start pulse SP indicative of start timing of one frame in the constitution of this embodiment shown in FIG. 6 are shown. Here, the detection ends S1 and S2 in the constitution shown in FIG. 6 are arranged at positions respectively corresponding to positions of the detection ends S1 and S2 in the constitution shown in FIG. 7.

Further, out of four waveform diagrams shown in FIGS. 8A and 8B, the upper waveform diagram of FIG. 8A and the upper waveform diagram of FIG. 8B respectively show waveforms which are acquired by performing the measurement when the backlight is ON, and the left lower waveform diagram and the right lower waveform diagram respectively show waveforms which are acquired by performing the measurement when the backlight is OFF. Further, in the respective waveform diagrams shown in FIGS. 8A and 8B, time is taken on an axis of abscissas and a voltage value is taken on an axis of ordinates, and the axis of abscissas and the axis of ordinates have the same scaling in all waveform diagrams.

For example, to compare the respective waveforms acquired at the detection ends S2 to each other in conjunction with the respective waveform diagrams shown in FIGS. 8A and 8B, it is found that the waveforms acquired by the right-side constitution of this embodiment exhibit amplitudes smaller than the waveforms acquired by the left-side constitution shown in FIG. 7. This result is shared in common between a state in which the backlight is ON and a state in which the backlight is OFF. Accordingly, it is reasonable to consider that, when the common sensing line Csen is arranged between the driver-power-source supply line GVL and the common-voltage-supply-use line Vcom, noises are hardly mixed to signals transmitted through the common sensing line Csen compared to a case in which the common sensing line Csen is arranged on the outermost side.

The influence exerted by noises on the signals transmitted through the common sensing line Csen can be confirmed by watching waveforms of the voltage at the detection end Si which is an input voltage of the common-voltage-supply-use line Vcom. That is, the voltage of the common-voltage-supply-use line Vcom is adjusted and amplified based on a result of the common sensing line Csen and is outputted and hence, noises which are mixed into the signals transmitted through the common sensing line Csen appear in a more emphasized manner. To study the waveform at the detection end SI in the respective waveform diagrams shown in FIGS. 8A and 8B, it is understood that the waveform acquired by the constitution of this embodiment of FIG. 8B is outputted with the smaller amplitude and the more beautiful waveform than the waveform acquired by the constitution shown in FIG. 7 of FIG. 8A.

Further, to compare the waveform when the backlight is ON and the waveform when the backlight is OFF, it is understood that, with respect to the constitution shown in FIG. 7, waving having a specific cycle is also mixed into waveforms at both detection ends S1 and S2 besides the above-mentioned noises when the backlight is ON. A cycle of waving is a time interval indicated by W in the waveform diagram on an upper side of FIG. 8A, for example. To be more specific, the cycle is approximately 120 μs to 130 μs. Accordingly, it is considered that the waving is generated due to a fact that the ON frequency of the backlight influences the signal transmitted through the common sensing line Csen.

To the contrary, according to the constitution of this embodiment, as can be understood from the waveform diagram on the upper side of FIG. 8B, no such waving is observed when the backlight is ON. Accordingly, by forming the common sensing line Csen between the driver-power-source supply line GVL and the common-voltage-supply-use line Vcom as in the case of the liquid crystal display device of this embodiment, it is possible to prevent the influence exerted by waving of the backlight.

As described above, in this embodiment, by forming the common sensing line Csen between the driver-power-source supply line GVL and the common-voltage-supply-use line Vcom, noises which are superimposed on the signals transmitted through the common sensing line Csen can be reduced thus eventually stabilizing the potential of the common-voltage-supply-use line Vcom with sufficient accuracy.

Although the present invention has been specifically explained in conjunction with the embodiment heretofore, it is needless to say that the present invention is not limited to the above-mentioned embodiment and various modifications are conceivable without departing from the gist of the present invention.

For example, the present invention is, provided that the liquid crystal display device is configured to feed back the common potential using the common sensing line Csen, applicable to any liquid crystal display device irrespective of a liquid crystal driving method. That is, the present invention is not limited to the lateral-electric-field-driving liquid crystal display device in which one pixel has the constitution shown in FIG. 3 to FIG. 5, and is also applicable to a liquid crystal display device having a vertical-electric-field driving display panel such as a VA-type display panel or a TN-type display panel.

What is claimed is:

1. A liquid crystal display device comprising:

a display panel including a plurality of scanning signal lines, a plurality of video signal lines, pixel electrodes each of which is arranged in a pixel region defined by the scanning signal lines and the video signal lines, and a common electrode, and a control printed circuit board including a scanning signal drive circuit for supplying a scanning signal to the scanning signal lines, a video signal drive circuit for supplying a video signal to the video signal lines, and a control circuit for controlling the signals supplied to the scanning signal drive circuit and the video signal drive circuit, wherein the display panel includes a common bus line electrically connected to the common electrodes and formed annularly on a periphery of the display region, a common sensing line for feeding back a voltage of the common bus line to the control printed circuit board, a scanning-signal-drive-circuit-use power source line for supplying electricity for driving the scanning signal drive circuit, and a common-voltage-supply-use line for supplying a common voltage to the common bus line, and the common-voltage-supply-use line, the common sensing line and the scanning-signal-drive-circuit-use power source line are formed along one side of the display panel to which at least the scanning signal drive circuit is connected, and the common sensing line is formed between the common-voltage-supply-use line and the scanning-signal-drive-circuit-use power source line on one side of the display panel.

2. A liquid crystal display device according to claim 1, wherein a plurality of printed circuit boards is connected to the display panel, and the scanning signal drive circuit is formed on the printed circuit boards, and all of the common-voltage-supply-use line, the common sensing line, and the scanning-signal-drive-circuit-use power source line are also formed on the printed circuit board on which the scanning signal drive circuit is formed.

3. A liquid crystal display device according to claim 2, wherein the common-voltage-supply-use line, the common sensing line and the scanning-signal-drive-circuit-use power source line are also formed on the display panel.

4. A liquid crystal display device according to claim 2, wherein the video signal drive circuit is formed on the printed circuit board, and the printed circuit board on which the video signal drive circuit is formed is connected to one side of the display panel different from a side of the display panel to which the printed circuit board on which the scanning signal drive circuit is formed is connected.

5. A liquid crystal display device according to claim 4, wherein the common-voltage-supply-use line is also formed on the printed circuit board on which the video signal drive circuit is formed.

6. A liquid crystal display device according to claim 4, wherein the printed circuit board is made of a flexible material.

7. A liquid crystal display device according to claim 1, wherein the control printed circuit board includes a common voltage generation circuit for generating a common potential to be supplied to the common-voltage-supply-use line, and the common voltage generation circuit includes a feedback circuit for adjusting a voltage of a common potential generated by the common voltage generation circuit by comparing the voltage of the common potential generated by the common voltage generation circuit and a potential acquired by the common sensing line.

8. A liquid crystal display device according to claim 1, wherein a connection portion between the common sensing line and the common bus line is formed on one side of the display panel to which the scanning signal drive circuit or the video signal drive circuit is not connected.

9. A liquid crystal display device according to claim 1, wherein the common bus line is arranged at a position closer to a peripheral portion of the display panel than an outer periphery of the display region.

10. A liquid crystal display device according to claim 1, wherein lines are formed in a net shape within the annular common bus line for supplying the common voltage to the common electrodes.

* * * * *